July 3, 1962 J. A. JOHNSON 3,042,749

PORTABLE SOUND REPRODUCING APPARATUS

Filed Sept. 2, 1958 2 Sheets-Sheet 1

Jarl A. Johnson
INVENTOR.

BY James F. Heiler
Jefferson D. Giller
William A. Stout
ATTORNEYS

Jarl A. Johnson
INVENTOR.

BY James F. Heiler
Jefferson D. Giller
William A. Stout
ATTORNEYS 3,042,749
PORTABLE SOUND REPRODUCING APPARATUS Jarl A. Johnson, 3004 Longwood Drive, Pasadena, Tex., assignor of thirty-three and one-third percent to Val Jean McCoy, Harris County, Tex.

Filed Sept. 2, 1958, Ser. No. 758,393
3 Claims. (Cl. 179—1)

The present invention relates to a portable sound reproducing apparatus and, more particularly relates to such an apparatus which is self-powered and utilizes a high performance compact transistor amplifier.

Generally when voice amplification is required at banquets, lectures, and other meetings a sound system utilizing a fixed microphone which is wired to a non-portable public address system is used. This requires that the speaker must be careful to stand the proper distance from the microphone, speak directly into it, and restrict his movements with respect to the microphone. While his freedom of movement is not so restricted if he utilizes a portable microphone to carry about with him still this will distract from his speech, will limit movement of his hands, and will still require that he speak directly into the microphone and hold it the proper distance from his face. However, for such uses as a guided tour or other uses which require extended movement while talking, the non-portable public address system with its unwieldly electrical cables will prove cumbersome and unsatisfactory. It is to overcome these disadvantages that the present invention is directed.

It is an object of this invention to provide a portable, self-powered, transistorized sound reproducing apparatus.

A further object of the present invention is the provision of a portable sound reproducing apparatus which features transformer coupling to the driver and a push-pull output stage for maximum performance and a special circuit for high tonal quality.

Yet a further object of the present invention is the provision of a portable sound reproducing apparatus which may be used in conjunction with sound input such as a microphone, a record player, a tuner, or a telephone pickup.

Yet a further object of the present invention is the provision of an improved portable sound reproducing system having a throat microphone which may be conveniently hung about a speaker's neck and yet allow free use of both of the speaker's hands.

A still further object of the present invention is the provision of a portable sound reproducing system which is lightweight, durable, inexpensive, and yet provides a high performance and high volume output.

Figure 1:
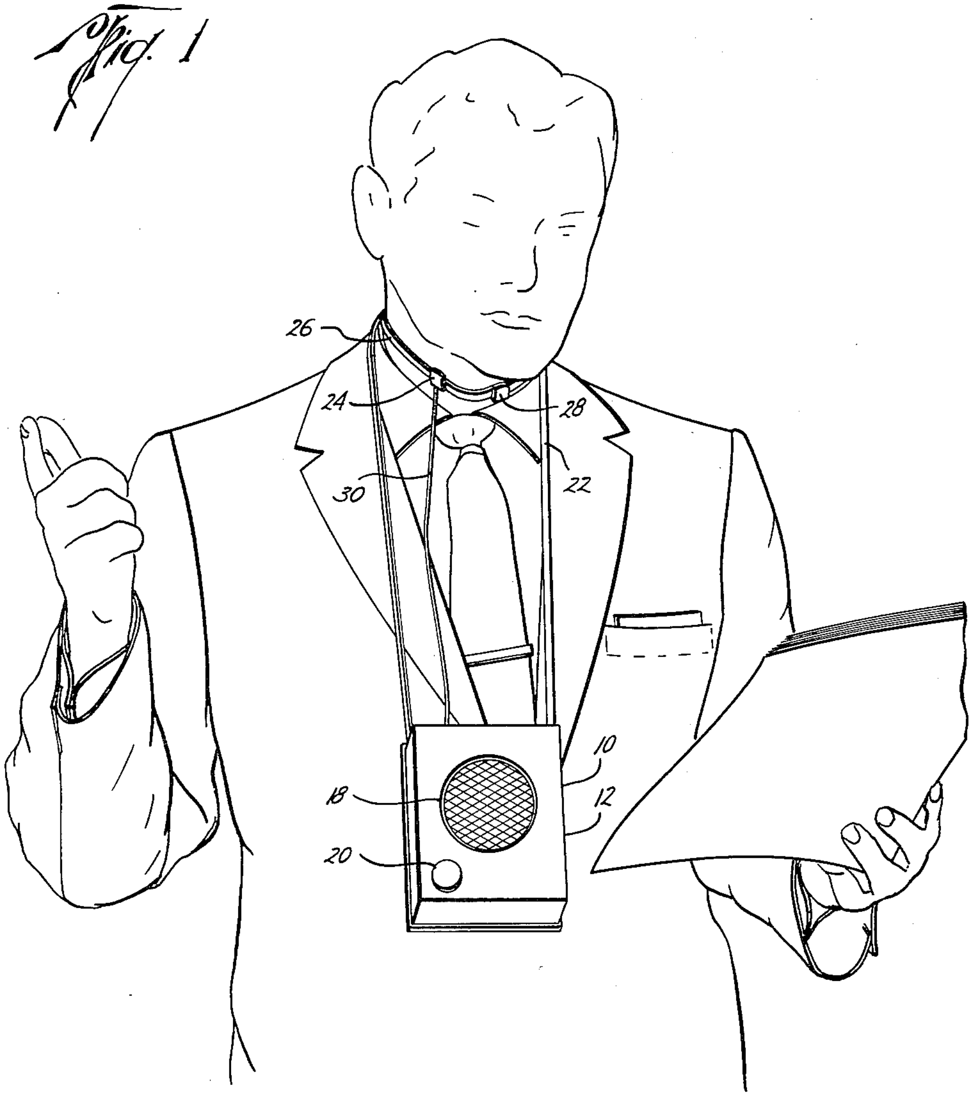
Figure 2:
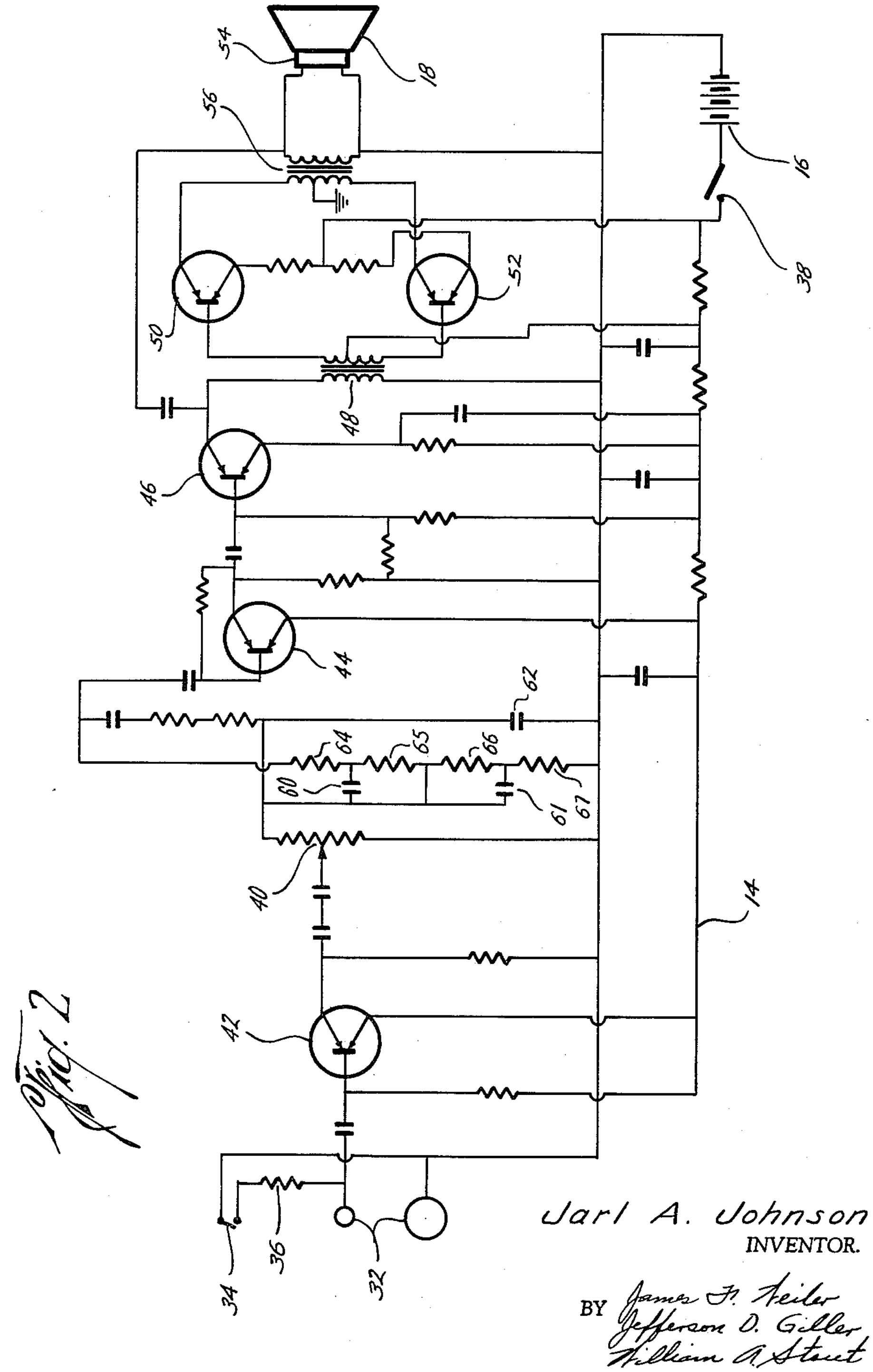

Other and further objects, features and advantages will be apparent from the following description of a presently preferred embodiment of the invention, given for the purpose of disclosure, and taken in conjunction with the accompanying drawings, where like character references designate like parts throughout the several views, and where FIGURE 1 is an elevational view illustrating the apparatus according to the invention in its use as a portable public address system, and FIGURE 2 is an electrical schematic view of the present invention illustrating the electrical components and their relationship.

Referring now to the drawings, the reference numeral 10 generally designates the portable sound system of the present invention and includes a case 12 which houses a transistor amplifier 14, a battery 16, a speaker 18, and a control switch 20.

The apparatus of the present invention is best seen in FIGURE 1 in its use as a portable public address system for use at banquets, conferences, lectures, guided tours and meetings where groups are large enough to require some method of voice amplification, yet not large enough to require the services of a large expensive non-portable public address system. Here the case 12 may be of any suitable plastic or metal composition and may be worn on the speaker's person by means of a neck strap 22. Preferably a throat microphone 24 is used which is supported around the speaker's neck by a band 26 having an adjustable connection 28. The throat microphone 24 is connected by means of electrical conductor 30 to the amplifier 14 by means of a standard pin plug jack 32 (FIGURE 2). It is thus noted that the portable sound system allows complete freedom of movement of the speaker and of the speaker's hands.

The electrical connections and apparatus are best seen in the electrical schematic of FIGURE 2. The sound input is fed to the input jack 32 and may come from the microphone 24 as previously described or from a battery powered tuner, a battery powered phonograph, or a telephone pickup, which are conventional and not part of the present invention and therefore are not shown. A toggle switch 34 and resistance 36, which may be in the order of 15K, is provided when a phonograph input is connected to the amplifier 14 thereby providing a load on the input jack 32 for improving the phonograph quality. The battery 16 is a long life battery which eliminates the need for an external power source for the amplifier thereby making it ideal for outdoor use as well as convenient for portable indoor use. The control switch 20 includes the off-on switch 38 which controls the battery supply to the amplifier and includes the potentiometer 40 which controls the amount of volume output.

The input to the jack 32 is fed successively to transistors 42, 44 and 46 which successively amplify the input signal. The signal is then passed through a push-pull amplifying output stage for maximum performance which includes transformer 48, and transistors 50 and 52. In the preferred example the transistors 42, 44 and 46 may be of the type 2N189 and the transistors 50 and 52 are of the type 2N186A, both types being manufactured by the General Electric Company of Schenectady, New York. Transformer 48 of the Argonne type AR173 is quite satisfactory. The output from the push-pull stage is then fed to the driver 54 by means of transformer 56. This transformer may be of any of the several standard types commercially available such as the Argonne type AR174.

A special circuit is provided for insuring high tonal quality and includes capacitors 60, 61 and 62 and resistances 64, 65, 66 and 67. Representative values for the capacitors 60, 61 and 62 are .02 mfd., .25 mfd. and .1 mfd., respectively. Representative values for the resistances 64, 65, 66 and 67 are 10K, 27K, 22K and 1K, respectively.

In use, the apparatus may be supported from a speaker's neck by a strap 22 or other supporting means and used as a portable sound system for voice amplification in conjunction with the use of a throat microphone 24 which is secured to the speaker's neck and electrically connected to the input jack 32. This device is light and inconspicuous and does not interfere with the speaker's use of his hands, from his moving from place to place, or from moving his head and thus is ideal for lectures, guided tours, or any other use which requires voice amplification. The apparatus is convenient to carry, for example, an apparatus weighing only twenty-one ounces and being four inches wide, five and one-quarter inches high and two and one-half inches deep using a three and one-half inch speaker has been found satisfactory. Of course, other types of microphones may be used such as a mouth microphone suspended by a support from the neck, but the throat microphone 24 is preferred.

As previously mentioned, the device may be used in conjunction with a phonograph, a tuner or a magnetic pickup placed near a telephone so that a telephone message may be heard by more than one person. These devices may be connected to the present invention by means of a conventional standard jack.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art which are encompassed within the spirit of the invention and the scope of the appended claims.

What is claimed is:

1. A portable sound reproducing system comprising a case, a speaker housed in said case, a battery housed in said case, an amplifier housed in said case and electrically connected to said battery and speaker, an input jack connected to the amplifier, transistors in said amplifier, two of said transistors arranged in a push-pull output stage, a throat microphone connected to said input jack, and a strap connected to the case arranged to support said case about a person's neck.

2. A portable loud speaker system comprising a case, a speaker housed in said casing, a battery housed in said case, an amplifier housed in said case and electrically connected to said battery and speaker, transistors in said amplifier, two of said transistors arranged in a push pull output stage, a strap connected to the case arranged to support said case about a person, and a microphone electrically connected to said amplifier and adapted to be supported from a person's neck.

3. The invention of claim 2 including an electrical jack connected to the amplifier, an electrical switch connecting resistance to said jack.

References Cited in the file of this patent

UNITED STATES PATENTS

| | | |
|---|---|---|
| 2,063,224 | Bowles | Dec. 8, 1936 |
| 2,676,207 | Hunt | Apr. 20, 1954 |
| 2,789,160 | Gage | Apr. 16, 1957 |
| 2,868,876 | Ticchioni | Jan. 13, 1959 |

FOREIGN PATENTS

| | | |
|---|---|---|
| 445,537 | Italy | Feb. 18, 1949 |

OTHER REFERENCES

"Transistors in Radio & TV," McGraw-Hill Book Co., published 1956, pages 114–116.